No. 758,768. PATENTED MAY 3, 1904.
H. J. MOHLENHOFF.
REVERSING GEAR AND CLUTCH MECHANISM.
APPLICATION FILED FEB. 24, 1902.
NO MODEL.
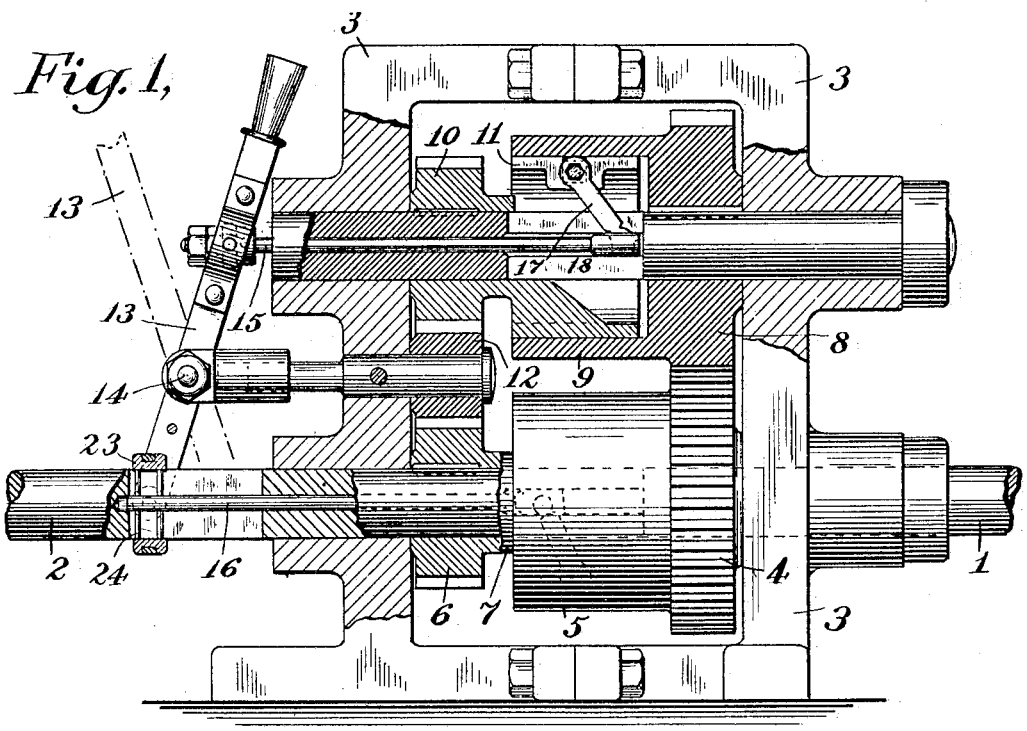
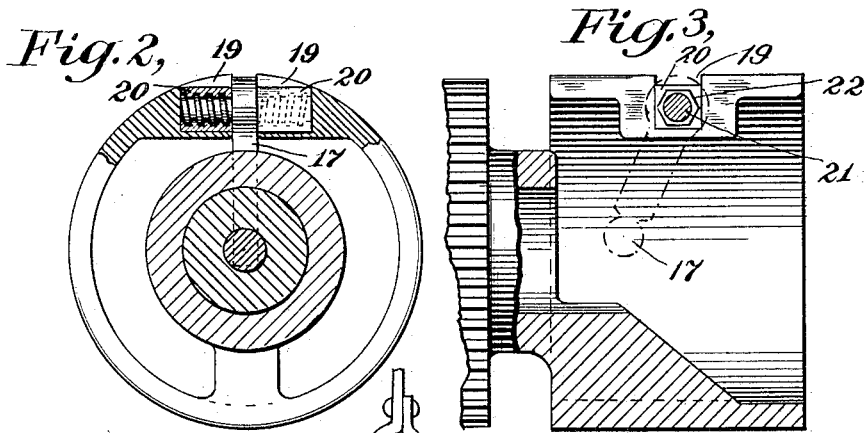
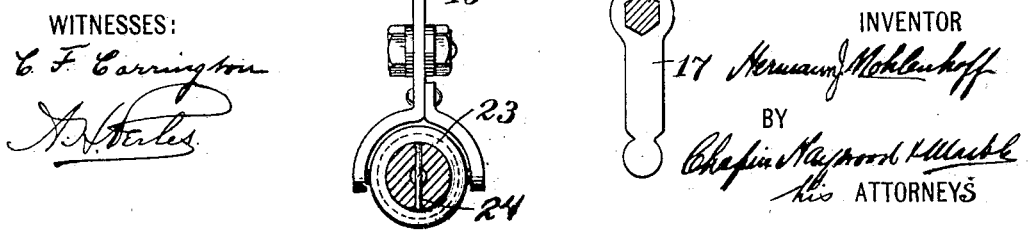
WITNESSES:
INVENTOR
Hermann J. Mohlenhoff
BY
his ATTORNEYS
THE NORRIS PETERS CO., PHOTO-LITHO., WASHINGTON, D. C.

No. 758,768. Patented May 3, 1904.

UNITED STATES PATENT OFFICE.

HERMANN J. MOHLENHOFF, OF NEW YORK, N. Y., ASSIGNOR, BY DIRECT AND MESNE ASSIGNMENTS, TO GEORGE K. WALLACE, FRED M. SAMES, AND CHARLES D. NEWTON, OF NEW YORK, N. Y.

REVERSING-GEAR AND CLUTCH MECHANISM.

SPECIFICATION forming part of Letters Patent No. 758,768, dated May 3, 1904.

Application filed February 24, 1902. Serial No. 95,202. (No model.)

*To all whom it may concern:*

Be it known that I, HERMANN J. MOHLENHOFF, a citizen of the United States of America, residing at New York, county of New York, and State of New York, have invented certain new and useful Improvements in Reversing-Gear and Clutch Mechanism, of which the following is a specification, reference being had to the accompanying drawings, forming a part thereof.

My invention relates to improvements in reversing-gear and clutch mechanism, and I will describe herein in detail an apparatus in which my invention is embodied and will then point out the novel features in the claims.

In the drawings, Figure 1 is a view, partially in side elevation and partly in central vertical section, of an apparatus embodying my invention. Fig. 2 is a transverse sectional view illustrating one of the expansible members of the clutch mechanism and certain connected parts in detail. Fig. 3 is a view of similar parts, partly in side elevation and partly in central longitudinal section. Fig. 4 is a view of the operating mechanism, taken at right angles to the point of view of Fig. 3. Fig. 5 is a detail view of a certain operating-lever employed, showing the preferred form of connection between it and its screw-threaded shank.

In the embodiment of my invention herein I have illustrated the drive and driven shafts in alinement with each other and mounted to rotate in suitable bearings in a framework 3 and have designated the drive-shaft by the reference character 1 and the driven shaft by the reference character 2. I will so refer to these shafts in the description hereinafter; but it will be obvious that the shaft 2 may equally well be the drive-shaft and the shaft 1 the driven shaft.

A primary gear-wheel 4 and one member 5 of a primary clutch are secured to rotate with the drive-shaft 1. A primary gear-wheel 6 and the other member 7 of the primary clutch are secured to rotate with the driven shaft 2. A secondary gear-wheel 8 and one member 9 of a secondary clutch are secured to rotate together with the teeth of the gear-wheel 8 in mesh with those of the primary gear-wheel 4. Another secondary gear-wheel 10 and the other member 11 of the secondary clutch are secured to rotate together, and the secondary gear-wheel 10 and the primary gear-wheel 6 are geared together through an intermediate idler-gear 12. The primary clutch 5 7 is arranged when operated in one direction to secure the primary drive-wheels 6 and 4 together, and hence to secure the driving and driven shafts directly together, so that the said driving and driven shafts will rotate together in the same direction. The secondary clutch 9 and 11 at such time will be out of operative position, and the members will rotate freely in opposite directions. When operatively connected, however, it will connect the secondary gear-wheels 8 and 10 together, and motion will then be transmitted from the driving-shaft 1 to the driven shaft 2 through primary gear-wheel 4, secondary gear-wheel 8, clutch 9 and 11, secondary gear-wheel 10, idler gear-wheel 12, and primary gear-wheel 6. At this time the clutch 5 7 will be out of operative position, and the shaft 2 will be driven by the shaft 1 in an opposite direction thereto, but at the same relative rate of speed. The relative rate of speed may of course be varied by varying the relative diameters of the gearing. The clutches are arranged to be operated by a reversing-lever 13, pivoted at 14 and connected above and below such pivotal support to operating-spindles 15 and 16. The shaft 2 and the shaft upon which the secondary gear-wheel 10 is mounted are hollow, and the operating-spindles 15 and 16 are mounted therein. The said operating-spindles connect at their inner ends with operating-levers 17, which pass through suitable slots 18, provided in the shafts for such purpose. At their outer ends the said spindles are connected to the reversing-lever 13, such connection being made through the driven shaft 2 by means of a collar 23, engaging the said lever 13 and connected through a suitable slot in the driven shaft 2 to the spindle 16 by means of pins or other form of connection 24. The members 7 11 of the primary and secondary clutches are expansion members and are caused to grip the relatively rigid members of the said clutches when expanded. The said expansion members are provided with recesses 19, which extend inwardly from their outer peripheries, and polygonal blocks 20 are fitted to the said recesses 19. These blocks are internally screw-threaded, and the operating-levers 17 are provided with externally-screw-threaded shanks 21, which are fitted to the screw-threaded blocks 20. It will be obvious that when an operating-lever 17 is rotated in one direction about the axis of its shank 21 the expansion member of its respective clutch will be expanded so as to grip the relatively rigid member, and the two clutch members will be operatively connected together. It will further be obvious that by reason of the operating-levers 17 being connected through the spindles 15 and 16 to the same lever upon opposite sides of its pivotal support when either clutch is operated the other one will be thrown out of operation.

I preferably form the shanks 21 of the operating-levers 17 with polygonal portions 22 at their center and fit them to corresponding orifices in their respective levers. This construction permits of an adjustment of the shank relatively to its operating-lever when the threads thereof or the threads of the nut or nuts with which they engage become worn. I further, preferably, give the blocks 20 and the central portions 22 of the shanks 21 different polygonal shapes in cross-section—that is to say, I make one, for instance, a square and the other a hexagon—whereby relative adjustment of the two parts may be made and a differential adjustment thereby transmitted to the threaded portion of the shank. In this way I obtain in a simple manner a very delicate adjustment to compensate for wear, and I am enabled to so adjust the clutches that the one will come into operation just as the other goes out of operation, and a change in direction may be transmitted from the driving to the driven shaft while the parts are running.

What I claim is—

1. The combination with a driving and a driven shaft axially in line one with the other, one of said shafts being hollow, and having a slot connecting with said hollow portion, a primary clutch comprising two members, one secured to the driving and the other to the driven shaft, a spindle mounted in said hollow shaft, and an operating-lever carried by one of said clutch members, extending inwardly through the slot in said hollow shaft and engaging said spindle, of a secondary clutch comprising two similar clutch members arranged axially in a line parallel with the axis of rotation of the said shafts and primary clutch, gearing connecting the members of one clutch with the members of the other clutch, a spindle and operating-lever for the secondary clutch, and a controlling-lever pivotally mounted at a point intermediate the axes of the primary and secondary clutches, and connected to both the said clutch-operating spindles.

2. The combination with a driving and a driven shaft axially in line one with the other, of a gear-wheel, rigidly secured to one shaft, having a hollow boss forming one member of a clutch, another gear-wheel rigidly secured to the other said shaft, having an integral hollow split hub, arranged within the boss of the other said gear-wheel, and forming the other member of said clutch, said member constituting an expansion member, and an operating-lever carried by said expansion member, of a secondary clutch comprising corresponding clutch members in gear with the first said clutch members and an operating-lever therefor; and a controlling-lever connected to both of said operating-levers to operate them simultaneously in opposite directions.

3. The combination with the relatively rigid member of a clutch mechanism, of an expansion member therefor, said member provided with a recess open at the outer periphery and extending inwardly therefrom, a block fitted to said recess and removable through the open portion thereof, at the periphery of the member, said block constituting a nut, and an operating-lever having a screw-threaded shank fitted to said nut.

4. The combination with the relatively rigid member of a clutch mechanism, of an expansion member therefor, said member provided with a recess open at the outer periphery and extending inwardly therefrom, a removable block fitted to said recess and having a diagonal greater than the width of the recess, whereby said block is prevented from turning in the recess, said block constituting a nut, and an operating-lever having a screw-threaded shank fitted to said nut.

5. The combination with the relatively rigid member of a clutch mechanism, of an expansion member therefor comprising a ring-like portion severed at one point only, said member provided with recesses in proximity to the point of severance, said recesses open to the outer periphery of the said member, and blocks fitted to said recesses and removable therefrom through the open portions thereof at the periphery, said blocks internally screw-threaded, and an operating-lever having a screw-threaded shank fitted to the said nuts.

6. The combination with the relatively rigid member of a clutch mechanism, of an expansion member therefor, said member provided with a recess, a removable and adjustable block fitted to said recess and constituting a nut, a screw-threaded shank fitted to said nut, and a lever to which said shank is adjustably secured.

7. The combination with the relatively rigid member of a clutch mechanism, of an expansion member therefor, said member provided with a recess, a polygonal block fitted to said recess and constituting a nut, a screw-threaded shank fitted to said nut and having a polygonal portion comprising a different number of sides than that of the polygonal block, and an operating-lever fitted to the said polygonal portion of said nut, substantially as set forth.

HERMANN J. MOHLENHOFF.

Witnesses:
M. M. CONOVER,
A. H. PERLES.